United States Patent [19]

Rozich

[11] Patent Number: 4,915,840

[45] Date of Patent: Apr. 10, 1990

[54] PROCESS FOR SLUDGE REDUCTION IN AN AEROBIC SLUDGE GENERATING WASTE TREATMENT SYSTEM

[75] Inventor: Alan F. Rozich, Wilmington, Del.

[73] Assignee: Bioprocess Engineering, Inc., Wilmington, Del.

[21] Appl. No.: 203,242

[22] Filed: Jun. 7, 1988

[51] Int. Cl.$^4$ .............................................. C02F 11/02
[52] U.S. Cl. ................................... 210/605; 210/607; 210/613; 210/625; 210/631
[58] Field of Search ............... 210/605, 607, 613, 625, 210/631

[56] References Cited

U.S. PATENT DOCUMENTS

| | | | |
|---|---|---|---|
| 2,129,267 | 9/1938 | Fischer | 210/607 |
| 2,875,151 | 2/1959 | Davidson | 210/605 |
| 3,356,609 | 12/1967 | Bruemmer | 210/610 |
| 3,547,814 | 12/1970 | McWhirter | 210/604 |
| 3,622,507 | 11/1971 | Pasveer | 210/625 |
| 3,670,887 | 6/1972 | McWhirter | 210/604 |
| 3,915,853 | 10/1975 | Luck | 210/612 |
| 4,026,793 | 3/1977 | Rein | 210/613 |
| 4,076,515 | 2/1978 | Rickard | 210/631 |
| 4,190,528 | 2/1980 | Dassen | 210/613 |
| 4,246,099 | 1/1981 | Gould et al. | 210/603 |
| 4,267,049 | 5/1981 | Erickson et al. | 210/613 |
| 4,652,374 | 3/1987 | Cohen | 210/603 |
| 4,663,043 | 5/1987 | Molin et al. | 210/605 |

FOREIGN PATENT DOCUMENTS 8804282 6/1988 PCT Int'l Appl. .
657604 9/1986 Switzerland .

OTHER PUBLICATIONS

Gaudy et al, Studies on the Total Oxidation of Activated Sludge With and Without Hydrolytic Treatment, Journal WPCF; vol. 43, No. 1; 1/71; pp. 40–54.
Proceedings 40th Annual Purdue Industrial Waste Conference, Ann Arbor Press, pp. 775–784 (1985).
Autothermal Thermophitic Aerobic Digestion in the Federal Republic of Germany–40th Annual Purdue Industrial Waste Conference May 1985.
Applications of Modified Extended Aeration Systems for Minimizing Sludge Production.
Total Oxidation Process Using an Aerobic Digester as Source of Recycle Sludge, Chem. Eng. Commun. vol. 23 pp. 137–150, 1983.
Autothermal Aerobic Digestion–Matsch et al. Journal WPCF, Feb. 1977 pp. 296–310.

Primary Examiner—Peter Hruskoci
Assistant Examiner—Christopher Upton

[57] ABSTRACT

This invention relates to an improved process for the treatment of municipal waste and particularly to the reduction of organic sludges generated in the biological digestion of organic material. In the conventional processes the waste containing organic matter is contacted with an oxygen-containing gas in the presence of biologically active organisms under conditions to produce biomass which, on separation, forms a sludge. A portion of the sludge often is returned to the aerobic digestion process. This invention relates to an improvement for sludge reduction in these processes wherein a portion of the sludge is hydrolyzed and then subjected to biological digestion in an autothermal aerobic digestion zone. The effluent from the autothermal aerobic digestion zone usually is returned to the initial aerobic digestion process or submitted for disposal.

In another embodiment of the invention, the hydrolyzed sludge is charged to an autothermal anaerobic digestion process wherein a substantial portion of the organic matter is converted into methane and the effluent from the autothermal anaerobic digestion process subsequently charged to the autothermal aerobic digestion process for effecting final reduction of organic matter. By these combinations one can generate a preselected value of sludge and, in some cases, one can operate under conditions such that there is no net generation of sludge.

14 Claims, 2 Drawing Sheets

PROCESS FOR SLUDGE REDUCTION IN AN AEROBIC SLUDGE GENERATING WASTE TREATMENT SYSTEM

TECHNICAL FIELD

This invention relates to an improved process for the treatment of municipal wastes in an organic sludge generating process.

BACKGROUND OF THE INVENTION

Numerous aerobic processes have been developed over the years for the biological treatment of municipal waste which includes both domestic and industrial sewage for yielding an environmentally acceptable effluent. One of the widely-used aerobic processes for such treatment is referred to as the activated sludge process wherein organic matter contained in the municipal waste is contacted with an oxygen-containing gas in the presence of suspended biologically active organisms under conditions such that the organic material is converted into a form which can be separated from purified water. A portion of the insoluble sludge that is formed is recycled to the aerobic zone. Another is the trickling filtration method wherein the microorganisms are fixed to a support.

As is known in activated sludge systems and other aerobic processes, e.g., the trickling filtration process, there is usually a significant net positive production of sludge containing suspended solids in the process and there is an increasing inventory of sludge. Excess sludge must be discarded on a periodic basis from the process. Biological sludges produced by the activated sludge process and other aerobic processes are difficult and expensive to treat because these sludges have poor dewatering properties and are highly putrescible. Because of these characteristics, sludge disposition has become an important problem in the environmental conservation area. Ocean dumping of sludge or use as landfill are objectionable in the environmental conservation arena because such sludges present health hazards to the environment. Prior to disposal, these sludges require pasteurization so that the concentration of pathogenic organisms is sufficiently low to avoid potential health hazards.

Numerous processes have been developed for sludge stabilization and one process traditionally used has been anaerobic digestion. In anaerobic processes, the organic material present in the sludge is oxidized to by-products such as organic acids, ammonia, and principally methane. One of the problems associated with anaerobic digestion is that it is high cost in operation and substantial time is required for the digestion process. Thus equipment tends to be of a large scale.

Another process for stabilizing activated sludge is referred to as extended aeration wherein the sludge is contacted in an aerobic digestion zone and the organic material oxidized over time. Although extended aeration may offer significant advantages over anaerobic digestion, there are problems associated with such processes because of high operating expenses and capital costs associated with the extended residence time required to effect biological oxidation.

There are many variations in processes associated with the aerobic treatment of municipal waste which includes an activated sludge concept or alternate aerobic processes for handling the net for excess production of sludge. Such processes are described in the following references and these include:

U.S. Pat. Nos. 3,547,814 and 3,670,887 disclose the treatment of sewage wherein gross solids are first removed from the sewage by screening and the remaining waste contacted with an oxygen-containing gas and activated sludge. The '814 patent discloses that anaerobic processes have been used to render the sludge nonputrescible and as noted require long-term storage, e.g., 30 days, etc. Even after such treatment, the residual solids from the process comprise from 40-50% of the original volume of excess sludge. Another suggested technique for treating such sludge involved extended aeration which increased the degree of auto-oxidation, i.e., the sludge became self-consuming to some degree, and there was a net reduction of such sludge. Unfortunately, the rate of oxidation was generally too low to have a significant effect on net sludge production. Even with extended aeration and increased degree of auto-oxidation, particularly at the zero net production of sludge level, problems were presented because of large plant size and high operating costs. For example, capacities were three to six times larger than a conventional activated sludge plant. To reduce size, the patentees suggested using an oxygen-rich gas and a high volatile suspended solids concentration in the sludge to oxidize organic material in the sludge. This resulted in a low sludge yield in the overall process.

U.S. Pat. No. 3,356,609 discloses a process for treating municipal waste wherein the initial sewage is clarified generating a bottoms fraction or raw sludge and effluent containing suspended or soluble organic matter. The effluent is then enriched with a carbon source and contacted with an oxygen-containing gas and activated sludge in a dispersed culture aerobic reactor. The product from the dispersed culture aerobic reactor is contacted with a flocculant and separated. The sludge formed then is separated in a secondary clarifier and a portion recycled to the aerobic reactor and the excess, along with the raw sludge from the primary clarifier, oxidized in a sludge aerobic reactor.

U.S. Pat. No. 4,246,099 discloses a combination of aerobic/anaerobic concepts to reduce and stabilize sludge solids in an activated sludge process. In this process, municipal sludge was initially contacted with an oxygen-containing gas under aerobic conditions to partially reduce the biodegradable volatile suspended solids and then anaerobically digested to partially-stabilize the sludge. Sludge reduction to less than 40% of the biodegradable volatile suspended solids introduced to the digestion zone was achieved. The concept disclosed for aerobic digestion was referred to as autothermal aerobic digestion wherein the digester was operated at elevated temperatures, e.g., from about 45°-75° C. or the thermophilic range. As the patentees indicated, the mesophilic microorganism population declined while the thermophilic forms increased and the rate of biological digestion increased at these higher temperatures.

U.S. Pat. No. 4,026,793 discloses an aerobic digestion process for reducing the solids content in a biodegradable organic sludge by carrying out the digestion in a vessel maintained at a temperature within the range of 38°-46° C. This temperature was alleged to enhance the development of protozoa Monodidae and thus enhance the reduction of solids in the sludge.

U.S. Pat. 4,652,374 discloses a modified anaerobic fermentation of municipal waste by effecting hydrolysis and acidification of the sewage and then anaerobically digesting the hydrolyzed sewage under conditions for methane generation.

It is also known in a modified extended aeration, activated sludge process in combination with autothermal aerobic digestion (ATAD) to use a hydrolytic assist which comprised the treatment of the effluent from the ATAD with acid and subjecting the resulting hydrolyzed effluent to biological digestion in the initial aeration zone wherein the sewage was contacted with an oxygen-containing gas and activated sludge. *Proceedings,* 40th Annual Purdue Industrial Waste Conference, Ann Arbor Press, Ann Arbor, MI, pp. 775–784 (1986).

As can be seen from the review of substantial prior art pertaining to aerobic processes, including activated sludge processes, many variations have been proposed in an effort to reduce or minimize sludge production and to stabilize excess sludge produced by aerobic processes. All of these processes in one way or another become quite complex and may exhibit high operating costs or capital costs in order to achieve that objective. In most cases, it is extremely difficult to modify these processes in such a way that there is substantial sludge reduction, based on original organic input, let alone achieving sludge elimination. The latter goal is one often sought but seldom achieved and typically requires intervening physical separation processes such as dewatering and subsequent incineration. Removal of organics from waste streams via respiration and conversion into microbial mass and its subsequent conversion to water and carbon dioxide is seldom achieved.

SUMMARY OF THE INVENTION

This invention relates to an improvement for sludge reduction in an aerobic process wherein municipal waste containing organic matter is biologically digested by contact with an oxygen-containing gas in the presence of biologically active organisms. In the basic process, municipal sewage usually is charged to a primary clarifier where grit and inorganic and heavy organic materials are separated by gravity. The effluent from the primary clarifier then is charged to an initial aerobic zone wherein the organic material contained in the effluent is contacted with an oxygen-containing gas and biologically active organisms under conditions for generating a mixed liquor which is then separated into a heavy sludge fraction and a disposable effluent. In one embodiment of the improved process for sludge reduction, the heavy sludge fraction is hydrolyzed by contact with acid or base and the resulting hydrolyzed sludge is usually combined with sediment from the primary clarifier and charged to an autothermal aerobic digester zone. The extent of hydrolysis is controlled such that the rate of biological digestion in the autothermal aerobic digester zone results in the production of an effluent containing a preselected concentration of organic matter. By proper control, a preselected net generation of sludge is produced by the aerobic sludge generating process thereby resulting in an overall preselected sludge reduction.

In another embodiment of the improved process for sludge reduction, the hydrolyzed sludge is combined with sediment from the primary clarifier and charged to an autothermal anaerobic digestion zone wherein autothermal anaerobic digestion of a portion of organic matter is achieved. In this digestion process, methane is recovered as a fuel and an effluent containing reduced organic content removed. This effluent is then charged to an autothermal digester zone for further reduction of organic material to produce sludge in a preselected concentration for return to the initial aerobic process.

Significant advantages are achieved through the use of a hydrolytic assist in the autothermal aerobic digester and the combination of autothermal anaerobic digestion and autothermal aerobic digestion embodiments of this invention. These advantages include:

an ability to significantly reduce the amount of sludge production to a preselected value in an aerobic process and, if desired, eliminate sludge production altogether without substantial intervening physical separation processes;

an ability to handle both inorganic and organic components in sludge to achieve sludge reduction;

an ability to use air in aerobic and autothermal aerobic digesters as an oxygen-carrying gas thereby reducing operating costs associated with the utilization of oxygen-rich streams;

an ability to effect decay with enhanced utilization of the oxygen carrying gas thus reducing power requirements for gas supply;

an ability to reduce capital costs associated with a sludge reduction process through size reduction of equipment; and an ability to operate a sludge reduction process with substantial sludge reduction without complex operating procedures and thus often operate at reduced costs.

THE DRAWINGS

DETAILED DESCRIPTION OF THE INVENTION

Figure 1:
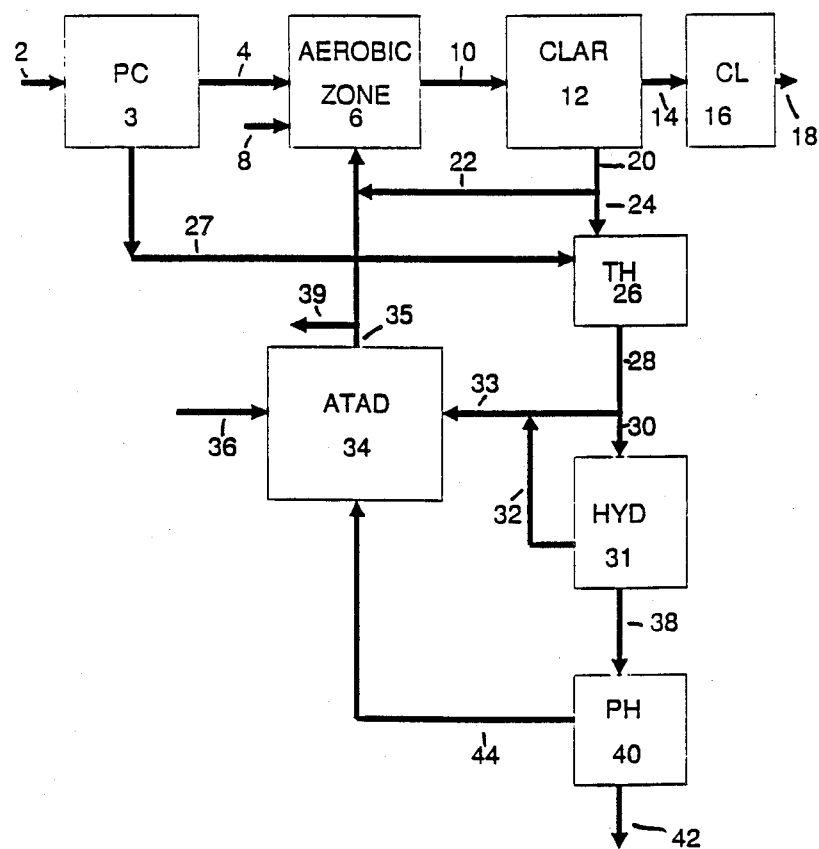
FIG. 1 is a block flow diagram of an activated sludge process incorporating a hydrolytic assist for an autothermal aerobic digestion zone (ATAD) for enhanced sludge reduction.

Referring to FIG. 1, which illustrates a purification system for treating sewage, industrial waste, municipal waste, etc., is charged through input line 2 to a primary clarifier (PC) 3 wherein separable solids primarily comprising sand and grit, as well as insoluble organics, settle via gravity generating an effluent containing suspended organic material and a solid fraction. The effluent containing suspended solids, e.g., from 50 to 400 mg/l and soluble $BOD_5$ ranging from 50–500 mg/l is removed through line 4 and enters aerobic or aeration zone 6. In this aeration zone, an oxygen-containing gas, e.g. air, or oxygen-rich stream, is introduced through line 8 and dispersed within the aqueous medium contained in aeration zone 6. Aeration zone 6 contains biologically active organisms in the form of activated sludge and the conditions are controlled within aeration zone 6 such that from about 50 to 80% of the organic matter in the form of volatile suspended solids and nitrogen and some phosphorus supplied with the effluent from line 4 is biologically digested. Typically, the concentration of volatile suspended solids within the aeration zone will range from about 1,000 to 5,000 mg per liter.

Aerating devices within aerobic zone 6 are designed to enhance oxygen transfer into the aqueous medium and such transfer usually is measured by determining the dissolved oxygen in the aqueous medium. To insure that sufficient oxygen is present in aeration zone 6, oxygen must be introduced at a rate at least equal to that rate at which it is consumed, and preferably in excess of such rate, which is usually evidenced by a measured dissolved oxygen content in the aeration zone. Usually the dissolved oxygen content is at least 0.1 part per million parts (ppm), and preferably above 1 ppm.

A mixed liquor containing suspended solids generated in aerobic zone 6 is carried by line 10 to secondary or final clarifier 12 (CLAR) wherein the separable solids in the mixed liquor are settled to form a heavy sludge and a purified effluent. The purified effluent overflows in secondary clarifier 12 and is removed from the process through line 14 and may be subjected to further treatment prior to disposal. Optional treatments of the purified effluent include chlorination, as noted in zone 16, and then it is discharged from the process through line 18.

A heavy sludge is withdrawn from secondary clarifier 12 through line 20 and a portion constitutes recycle activated sludge for aerobic zone 6. The recycle activated sludge is charged to aerobic zone 6 via line 22 along with effluent from line 4 and recycled (to be discussed) at a rate sufficient to provide a volatile suspended solids content of at least 50%, and preferably within a range of from 1,000 to 5,000 mg/l in aerobic zone 6. To maintain activity, the recycle of activated sludge is preferably done quickly and under conditions such that the biologically active organisms are not deprived of oxygen during this transfer.

The balance of heavy sludge from secondary clarifier 12 is withdrawn and removed via line 24 and charged to vessel 26 for accommodating adjustment of the solids content of the activated sludge. Typically, the solids content of the activated or heavy sludge withdrawn from secondary clarifier 12 ranges from about 0.5 to 1.5% solids. This sludge is combined with the clarified sediment containing from 2-5% solids from primary clarifier 3 via line 27. Depending upon the level of sludge generation in the overall process, the concentration of solids in secondary thickening vessel 26 is increased and adjusted to a level of from about 3 to 10% by weight. Vessel 26 (TH) generally utilizes conventional mechanical apparatus for secondary thickening or concentrating the activated sludge. However, chemical flocculating agents can be added to achieve desired solids concentration. The activated sludge of preselected suspended solids content of 3 to 10% by weight is withdrawn from vessel 26 through line 28. A portion is withdrawn from line 28 through line 30 for further treatment in hydrolysis vessel 31 (to be described). A portion of hydrolyzed sludged removed through line 32 for combination with thickened sludge from line 28 and then charged via line 33 to autothermal aerobic digester zone (ATAD) 34.

The biological digestion of sludges in an autothermal aerobic digestion unit (ATAD) is a known process and discussions of autothermal thermophilic aerobic digestion techniques are set forth in a paper presented at the 40th annual Purdue Industrial Waste Conference, West Lafayette, Ind. May 14–16, 1985 entitled "Autothermal Thermophilic Aerobic Digestion in the Federal Republic of Germany" and in U.S. Pat. No. 4,246,099, the subject matter of which is incorporated by reference. In autothermal aerobic digester zone 34, air, or other oxygen-containing gas, e.g., high purity oxygen, is introduced through line 36 at a rate sufficient for the autothermal thermophilic aerobic digestion of the suspended solids. In this process, a temperature of from about 35°–75° C. is maintained, and the heat generated in the process should be sufficient to maintain temperature without external heating. These autothermal self-heating units contain the metabolic heat generated and require no external heat addition to maintain the autothermal digester at appropriate conditions. The nonconverted product containing organic material of preselected concentration usually from 0.5 to 2% solids, is removed as effluent from autothermal aerobic digester zone 34 via line 35 and all or a portion charged to initial aeration digester zone 6. The recycle plus recycle from secondary clarifier 12 is adjusted to give the desired preselected sludge value. With appropriate decay in autothermal digester zone 34, no net sludge generation is possible. That portion not charged to aerobic zone 6 is removed through line 39 for disposal.

To control sludge reduction to a preselected value, and for total sludge elimination, a portion of the thickened biologically activated sludge is withdrawn from line 28 through line 30 wherein it is contacted in hydrolysis vessel 31 (HYD) with acid e.g., sulfuric acid or base, e.g., alkali metal hydroxide under conditions sufficient to effect hydrolysis of macromolecular components of the organic cells and effect dissolution of inorganic components. Mild acid hydrolysis is achieved in vessel 31 by adding acid and maintaining a pH in the range of from about 0.5 to 2 at a pressure ranging from atmospheric to about 30 psig at temperatures ranging from about 80° to 130° C. for about 2 to 10 hours typically about 4–6 hours. Alkaline hydrolysis can also be effected and this is achieved by contacting with alkaline materials, e.g., sodium hydroxide and maintaining a pH of from about 7 to 12 and a temperature of 20° to 50° C. for about 5 to 12 hours. This hydrolytic assist modifies the cell structure of the macromolecular components and renders them essentially soluble and thereby enhances the ability of the biologically active organisms to effect thermophilic decay within the autothermal aeration digester zone 34. By increasing or decreasing the amount of the thickened sludge subjected to hydrolysis one increases or decreases the rate of decay for the system and sludge reduction levels can be controlled by controlling the rate of such decay and thus, the extent of decay.

Optionally, some of the sludge in the effluent in line 35 may be hydrolyzed by removing a portion of the effluent and subsequently charging to vessel 31. This treatment has the primary function of solubilizing recalcitrant solids and to recover heat value from the effluent.

Temperature within autothermal aerobic digestion zone 34 can be controlled upwardly within a range from 35° to 75° C. by increasing solids concentration to the reactor or by increasing the amount of material hydrolyzed in vessel 31. An increased organic content or increased rate of reaction will tend to increase the amount of heat generated and thus the operating temperature increased within the autothermal aerobic digester zone 34. Alternatively, increased temperatures can be achieved through the utilization of an oxygen-rich gas for effecting biological digestion. The utilization of an oxygen-rich gas reduces air flow through the autothermal aerobic digestion zone which reduces the amount of heat required to warm the gas to operating temperature and reduces the amount of heat removed through evaporation. If, on the other hand, excessive temperatures are being encountered within autothermal aerobic digestion zone 34, solids concentration can be decreased, the level of material hydrolyzed can be decreased, or air can be utilized as the oxygen-containing gas; and lastly, increased air flow through the autothermal aerobic digestion zone can be increased to decrease temperature. Of these increased air flow will serve to decrease the temperature since increased air flow will result in increased evaporation of water in the digestion process. Adjustment of air flow is the preferred mechanism for control.

Hydrolyzed sludge not charged to autothermal aerobic digestion zone 34 may be treated for removal of phosphorus or nitrogen or may be adjusted in pH for optimizing decay in the autothermal aerobic digestion zone. Hydrolyzed sludge is withdrawn from vessel 31 through line 38 and charged to tank 40 wherein pH, for example, is adjusted upwardly to an alkaline level for precipitation of phosphorus compounds which are then removed through line 42. The balance of material in vessel 40 is removed through line 44 and charged to autothermal aerobic digester zone 34.

Figure 2:
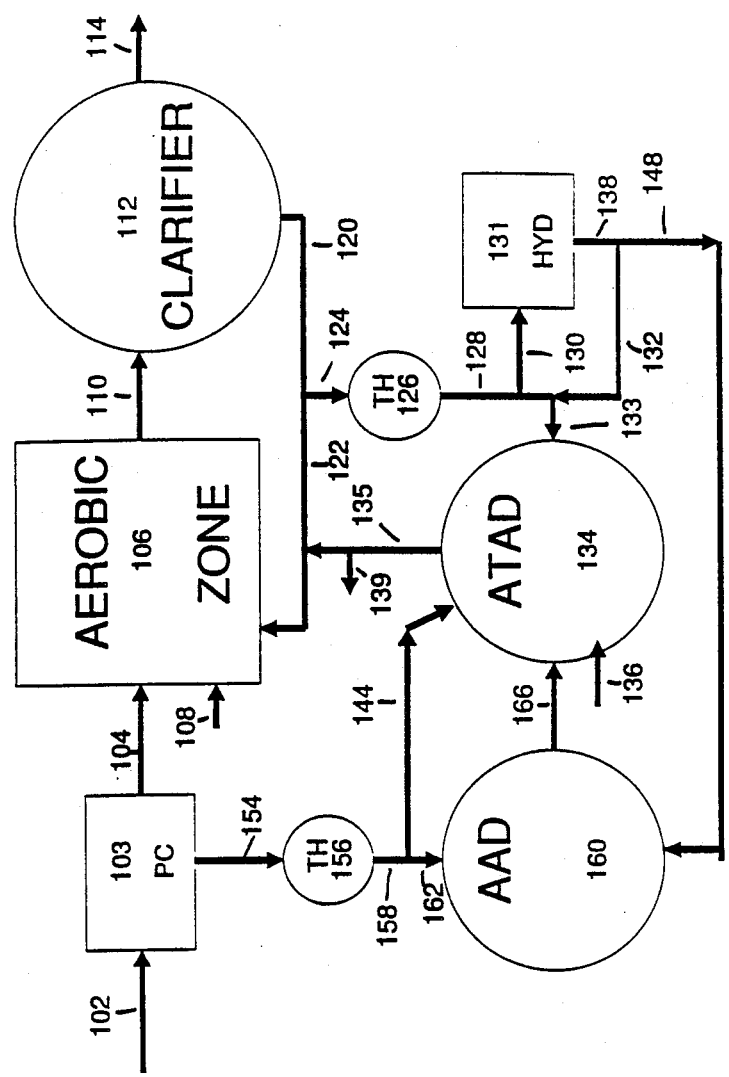
FIG. 2 is a block flow diagram of an activated sludge process using a hydrolytic assist with an autothermal anaerobic digestion zone (AAD) coupled with an autothermal aerobic digester zone (ATAD).

In another embodiment of the invention, as illustrated in FIG. 2, the process includes an autothermal anaerobic digestion zone (AAD) which results in the production of methane as a fuel source. To the extent the equipment and lines are common as in FIG. 1, a 100 numerical series has been used. Equipment function is the same as described for FIG. 1. In this embodiment, influent through line 102 is sent to primary clarifier 103, and sediment including organic matter from primary clarifier 103 withdrawn through line 154 and charged to vessel 156 for primary thickening. Typically, the solids concentration in the sediment removed from primary clarifier 103 ranges from 2 to about 5% by weight. Primary thickening is achieved in vessel 156 usually by means of mechanical assistance wherein suspended solids are caused to settle or settling assisted by means of a chemical thickener. A thickened suspension having a solids content of from about 3 to 8% by weight is withdrawn from vessel 156 through line 158 wherein a portion is charged to autothermal anaerobic digestion zone 160 (AAD) via line 162. The balance of the thickened suspension is withdrawn through line 164 and charged to autothermal aerobic digestion zone 134.

The principle of autothermal anaerobic digestion (AAD) is known, and it basically represents anaerobic digestion operating in the mesophilic range of 25°-50° C. or thermophilic range 45°-60° C. where no heat is added to anaerobic digestor. Temperatures usually range from 35°-50° C. and a residence time of from 15 to 30 days may be required. Typically, the concentration of suspended solids in the effluent from autothermal anaerobic digester zone 140 will range from about 2 to 6% by weight. The effluent from autothermal anaerobic digestion zone 160 is withdrawn through line 166 and undergoes final biological digestion in autothermal aerobic digester 134.

The rate of anaerobic digestion within autothermal anaerobic digester zone 160 is largely influenced by the amount of thickened, activated sludge hydrolyzed in vessel 131 depending upon fuel requirements and levels charged to the autothermal anaerobic digestion zone. Preferably, substantially all of the thickened hydrolisate is withdrawn via line 138 and charged to autothermal anaerobic digester zone 160 in order to recover fuel value from this sludge. Optionally, a portion may be charged via line 132 and combined with thickened sludge via line 133 and charged to autothermal aerobic digester zone 134. The amount of hydrolyzed material submitted to autothermal anaerobic digestion and conditions in the autothermal anaerobic digestion zone may be controlled to maximize fuel production consistent with sludge reduction to a preselected value.

As previously mentioned, one of the significant advantages of the improved sludge reduction processes shown in FIGS. 1 and 2, given the particular process concepts involved for the biological digestion of organic components contained in municipal sewage, is the ability to reduce sludge to a preselected value. Sludge reduction values commonly associated with systems in the prior art can be achieved by the processes disclosed with minimal operating costs and minimal capital costs. In addition, total sludge reduction in an activated sludge process can be achieved within acceptable residence times and operating costs. Control of the process to achieve sludge reduction to a preselected level, and particularly for total sludge elimination, including inorganics, is achieved by monitoring the extent of biological digestion in aerobic zone 6 and 106, autothermal aerobic digestion zone 34 and, where used, as in FIG. 2, digestion in autothermal aerobic digester zone 134 and autothermal anaerobic digestion zone 160. Primarily, control is enhanced through the hydrolytic assist associated with the hydrolysis of the sludge. The amount of sludge hydrolyzed and charged to autothermal aerobic digestion zone 34 and 134 or, if included, autothermal anaerobic digestion zone 160 for subsequent biological digestion in autothermal aerobic digestion zone 134 controls the rate of digestion such that sludge reduction to a preselected value and total sludge elimination is easily achieved. When there is a concentration excursion of organics in the municipal waste charged through inlet line 2 or 102, e.g., sludge concentration may be increased or additional sludge can be hydrolyzed for enhancing the efficiency of biological digestion ultimately in autothermal aerobic digester zone 34 (FIG. 1) or the combination of autothermal anaerobic digester zone 160 and autothermal aerobic digester zone 134 (FIG. 2).

The processes described lend themselves to conventional steady state mass balance equations. By setting the sludge reduction or mass balance equations to zero or a preselected value, e.g., 10% sludge production and less, one can understand the significant advantages achieved by this process wherein the initial aerobic digestion involves substrate uptake and biomass growth while the autothermal aerobic digestion zone; and, if used, autothermal anaerobic digestion zone greatly enhances aerobic and anaerobic digestion of organic material maximizing energy production from the organic input to the process plus enhancing the autothermal aerobic digestion process and thereby minimize secondary sludge production. The hydrolytic assist for the autothermal aerobic digestion, even when the autothermal anaerobic digestion zone is employed, greatly enhances the decay process and enhances the level of organic and inorganic material removed from the system. This ability to adjust solids concentration and amount of sludge hydrolyzed, etc., and thus substantially affect the rate of biomass formation and respiration to carbon dioxide and water permits sludge reductions to levels not previously achieved and flexibility in the process.

The following examples are intended to illustrate various embodiments of the invention:

EXAMPLE 1

Activated Sludge Process Using Hydrolytic Assist with ATAD Unit and Without AAD Unit A design was developed for a 10 million gallon per day (MGD) wastewater treatment plant embodying the principles set forth in FIG. 1. The municipal waste influent was estimated at 220 mg/l suspended solids with a volatile suspended solids (VSS) concentration of approximately 70% of suspended solids. The $BOD_5$ was estimated to be equal to 220 mg/l. The effluent discharged from the plant was permitted at a $BOD_5$ requirement of 30 mg/l and having a 30 mg/l suspended solids content. The design further assumed that 50% of the influent suspended solids were removed in the primary clarifier system and that 30% of the raw sewage as $BOD_5$ were removed thus providing an influent to the activated sludge aerobic zone of 154 mg $BOD_5$/liter. The recycle flow ratio was 0.25. The mean hydraulic time for the aerobic zone was 8 hours and the mean hydraulic time for the ATAD unit was 18 days based on a capacity of 1 MG.

Calculations were made to determine solids loading throughout the waste treatment system based on the following performance criteria, the true cell yield of 0.5 mg/l was assumed for aerobic zone 6 and 0.25 mg biomass/mg $BOD_5$ in the ATAD and AAD. A decay constant of 0.1 day$^{-1}$ was assumed for aerobic zone 6 and for the ATAD unit 34. Further, it was assumed that 20% of the sludge was hydrolyzed with 90% solubilization of the sludge to the hydrolyzer. The secondary thickener yields 4% sludge by weight was deemed to be 70% volatile and had a specific gravity of 1.01.

Table 1 sets forth the stream/unit feeds and performance data.

TABLE 1

| Stream/Unit | $BOD_5$ mg/l | Suspended VSS mg/l | Flow Rate MGD | Solids In lb/day | Destroyed lb/day |
|---|---|---|---|---|---|
| 2 | 220 | 154 | 10 | 12,972 | — |
| 4 | 154 | 77 | 9.9632 | 6,469 | — |
| 6 | 30 | 1,494 | 12.6044 | 158,621 | — |
| 10 | — | 1,494 | 12.6044 | 158,621 | — |
| 14 | 30 | 21 | 10 | 1,769 | 1,769 |
| 20 | — | 7,150 | 2.6044 | 156,852 | — |
| 22 | — | 7,000 | 2.4908 | 146,867 | — |
| 27 | — | 21,000 | 0.0368 | 6,510 | — |
| 28 | — | 34,968 | 0.056 | 16,495 | — |
| 31 | 15,641 | 3,498 | 0.0112 | 330 | 2,969 |
| 34 | ↓ | 9,849 | 0.056 | 4,832 | 8,698 |
| Total- | Produces about 230 lb/day sludge at 44 mg/l in ATAD | | | | 13,436 |

From the above table, 13,426 lb/day solids are charged to the ATAD unit. At a decay constant of 0.1 day$^{-1}$, sludge reduction of 65% was achieved. A theoretical decay rate of about 0.13 day$^{-1}$ would be required for 10% sludge generation in the system and the actual decay rate in the ATAD unit is more closely related to the theoretical rate than it is to the 0.1 day$^{-1}$ used for the calculations.

EXAMPLE 2

ATAD Without Hydrolysis

The procedure of Example 1 was repeated except that hydrolysis to the ATAD unit was eliminated. Table 2 sets forth conditions and results.

TABLE 2

| | ATAD w/o Hydrolysis | | | | |
|---|---|---|---|---|---|
| Stream/Unit | $BOD_5$ mg/l | Suspended VSS mg/l | Flow Rate MGD | Solids In lb/day | Destroyed lb/day |
| 2 | 220 | 154 | 10 | 12,972 | — |
| 4 | 154 | 77 | 9.9632 | 6,462 | — |
| 6 | 30 | 1,507 | 12.6044 | 160,011 | — |
| 10 | — | 1,507 | 12.6044 | 160,011 | — |
| 14 | 30 | 21 | 10 | 1,769 | 1,769 |
| 20 | — | 7,213 | 2.6044 | 158,242 | — |
| 22 | — | 7,000 | 2.4908 | 146,867 | — |
| 27 | — | 21,000 | 0.0368 | 6,510 | — |
| 28 | — | 37,915 | 0.0560 | 17,885 | — |
| 34 | — | 13,542 | 0.0560 | 6,388 | 11,497 |
| Total | | | | | 13,266 |

EXAMPLE 3

Hydrolysis of ATAD Effluent Recycled to Aerobic Zone

The procedure of Example 1 was repeated except that the effluent from the ATAD Unit was hydrolyzed and the hydrolyzed effluent recycled to the aerobic zone. Table 3 sets forth the results.

TABLE 3

| | ATAD and Hydrolysis (Hydrolyis to Aeration Tank) | | | | |
|---|---|---|---|---|---|
| Stream/Unit | $BOD_5$ mg/l | Suspended VSS mg/l | Flow Rate MGD | Solids In lb/day | Destroyed lb/day |
| 2 | 220 | 154 | 10 | 12,972 | — |
| 4 | 154 | 77 | 9.9632 | 6,469 | — |
| 6 | 30 | 1,491 | 12.6644 | 159,006 | — |
| 10 | — | 1,491 | 12.6644 | 159,006 | — |
| 14 | 30 | 21 | 10 | 1,769 | 1,769 |
| 20 | — | 7,017 | 2.6604 | 157,237 | — |
| 22 | — | 7,000 | 2.4908 | 146,867 | — |
| 27 | — | 21,000 | 0.0368 | 6,510 | — |
| 28 | — | 28,628 | 0.070 | 16,880 | — |
| 31 | 15,641 | 2,866 | 0.014 | 338 | 3,038 |
| 34 | — | 10,481 | 0.056 | 4,944 | 8,898 |
| Total- | Produces about 230 lb/day sludge at 44 mg/l in ATAD | | | | 13,705 |

EXAMPLE 4

ATAD and AAD With Hydrolysis

The procedure of Example 1 was repeated except that an AAD unit was added as shown in FIG. 2. The volume of the AAD unit was 0.45 MG and the mean hydraulic detention time was 20 days. Primary thickening resulted in a sludge concentration of 8% by weight. Table 4 sets forth the results.

TABLE 4

| | AAD and ATAD With Hydrolysis | | | | |
|---|---|---|---|---|---|
| Stream/Unit | $BOD_5$ mg/l | Suspended VSS mg/l | Flow Rate MGD | Solids In lb/day | Destroyed lb/day |
| 102 | 220 | 154 | 10 | 12,972 | |
| 104 | 154 | 77 | 9.9632 | 6,469 | |
| 106 | 30 | 1,479 | 12.6448 | 157,532 | |
| 110 | — | 1,479 | 12.6448 | 157,532 | |
| 114 | 30 | 21 | 10 | 1,769 | 1,769 |
| 120 | — | 7,000 | 2.6448 | 155,947 | |
| 124 | — | 7,000 | 0.154 | 9,080 | |
| 126 | — | 7,000 | 2.4908 | 146,867 | |
| 128 | | 28,000 | 0.0385 | 9,080 | |
| 131 | 12,521 | 2,806 | 0.0077 | 182 | 1,634 |
| 133 | | 28,000 | 0.0308 | 7,264 | |
| 134 | | 7,240 | 0.056 | 3,415 | 6,147 |

TABLE 4-continued

AAD and ATAD With Hydrolysis

| Stream/Unit | BOD$_5$ mg/l | Suspended VSS mg/l | Flow Rate MGD | Solids In lb/day | Destroyed lb/day |
|---|---|---|---|---|---|
| 138 | | 2,806 | 0.0077 | 182 | |
| 154 | | 21,000 | 0.0368 | 6,510 | |
| 160 | | 12,688 | 0.0215 | 2,298 | 4,597 |
| 162 | | 56,000 | 0.0138 | 6,510 | |
| Total- | Produces about 203 lb/day sludge at 44 mg/l in AAD unit | | | | 14,147 |

From this data, 6,895 lb/day solids are charged to the AAD unit with 67% destroyed. Overall, 10,744 lb solids/day are destroyed resulting in 65% destruction.

From the calculations set forth in Examples 1-4, solids distribution within the ATAD unit are lowest in Example 4 followed by Examples 1, 3, and 2, respectively. In Example 4, substantial organic matter is consumed in the AAD unit thus showing a lower solids content in the ATAD unit. However, on comparing Examples 1 and 3, which utilize the same equipment and general processing steps, lower solids are found in both the ATAD unit and aerobic zone. At this point in time in the process, it is apparent that such solids must be destroyed to achieve desired sludge reduction, and it is also apparent that more power would be required in the Example 2 and 3 systems to reduce those solids to the same level as in Example 1.

The Example 2 process shows significantly more solids distributed throughout the system and more power would be required to reduce those solids to the same level as in Example 1. If solids reduction is impossible by the addition of power alone, longer residence times may be required for both the Example 2 and 3 systems.

Although the system described in Examples 1 and 4 show advantages over the Examples 2 and 3 systems, the significance is not shown since mass balances were based on the same decay constant for all systems. Through the use of the hydrolytic assist to the ATAD unit decay rates can be increased significantly and thus more solids reduced throughout the system with the same power as in Examples 2 and 3. On the other hand, there is little one can do to the Example 2 and 3 systems to alter the rate of decay in the system. It is for these reasons sludge reduction of 90% and greater, i.e., a 10% or less sludge generation can be achieved.

What is claimed is:

1. In an activated sludge process wherein waste containing organic matter is contacted in an aerobic zone with an oxygen-containing gas in the presence of suspended biologically active organisms under conditions for effecting biological digestion of said organic matter and generating an effluent containing suspended organic matter, said effluent being separated into a disposable aqueous fraction and a heavy sludge fraction containing organic solids, with a portion of the sludge being recycled to said aerobic zone, the improvement for enhancing sludge reduction in said activated sludge process which comprises the steps:
   (a) hydrolyzing at least a portion of said heavy sludge fraction under conditions for solubilizing at least a portion of said organic solids therein and thereby forming a hydrolyzed sludge containing solubilized organics;
   (b) charging said hydrolyzed sludge to an autothermal thermophilic aerobic digester zone wherein the hydrolyzed sludge is contacted with an oxygen-containing gas at a temperature ranging from 35°-75° C. for digesting and effecting decay of said solubilized organics and generating an effluent stream;
   (c) removing said effluent stream from said autothermal thermophilic aerobic digester zone.

2. The process of claim 1 wherein the heavy sludge fraction is thickened to a concentration of from 3-10% by weight of organic matter.

3. The process of claim 2 wherein air is used as said oxygen-containing gas in the autothermal aerobic digester zone.

4. The process of claim 3 wherein the hydrolysis of said organic matter in said heavy sludge is controlled such that the organic matter in said autothermal aerobic digester zone is consumed to a preselected value such that there is no net generation of sludge in said activated sludge process.

5. The process of claim 3 wherein the net sludge produced in less than 10% of the organic matter introduced in said municipal waste and said hydrolyzing is accomplished by contacting said organic matter with acid.

6. The process of claim 5 wherein the concentration of organic matter in said aerobic zone ranges from 1,000 to 5,000 mg. per liter organic matter.

7. The process of claim 3 wherein at least a portion of the effluent stream from said autothermal aerobic digester zone is recycled to the aerobic zone.

8. The process of claim 7 wherein at least a portion of the organic matter in said waste is first clarified in a primary clarifier forming an effluent containing organic matter and a sediment containing solids and the resulting sediment thickened to a solids concentration of from about 3 to 8% by weight, the resultant thickened sediment charged to an autothermal anaerobic digester zone under conditions for biologically digesting at least a portion of said organic matter generating a byproduct gas stream containing methane and an effluent stream which is then submitted to said autothermal aerobic digester zone.

9. In an aerobic process wherein a municipal waste influent containing organic matter is contacted in an aerobic zone with an oxygen-containing gas and biologically active organisms under conditions for effecting biological digestion of organic matter and generating an effluent-containing suspended organic matter and heavy sludge and separating the heavy sludge from the effluent, the improvement for enhancing sludge reduction in said process which comprises:
   hydrolyzing at least a portion of the heavy sludge in a hydrolysis vessel by contacting said heavy sludge under conditions for solubilizing at least a portion of organic solids contained in said heavy sludge and thereby forming a hydrolyzed sludge containing solubilized organic matter;
   charging said hydrolyzed sludge containing solubilized organic matter to an autothermal aerobic digester zone operated at a thermophilic temperature from 35°-70° C. for digesting said solubilized organic matter and generating a stream containing reduced organic material; and
   removing said stream containing reduced organic matter.

10. The process of claim 9 wherein said heavy sludge is concentrated to a level of from 3 to 10% by weight.

11. The process of claim 9 wherein the municipal waste influent is initially sent to a primary clarifier and a clarified sediment and effluent formed, said clarified sediment is concentrated to a level of from 3 to 8% by weight and then a portion charged to an autothermal anaerobic digester zone, the effluent being charged to the aerobic zone.

12. The process of claim 11 wherein said hydrolyzing is effected by contacting said sludge with acid.

13. The process of claim 11 wherein a portion of said stream from said autothermal aerobic digester zone is recycled to the hydrolysis vessel and hydrolyzed with said heavy sludge.

14. The process of claim 11 wherein a portion of said stream from said autothermal aerobic digester zone is charged to said aerobic zone.

* * * * *